United States Patent
Karlsen et al.

(10) Patent No.: US 9,709,810 B2
(45) Date of Patent: Jul. 18, 2017

(54) SINGLE-EMITTER LINE BEAM SYSTEM

(71) Applicant: nLIGHT Photonics Corporation, Vancouver, WA (US)

(72) Inventors: Scott R. Karlsen, Battle Ground, WA (US); David C. Senders, Portland, OR (US)

(73) Assignee: nLIGHT, Inc., Vancouver, WA (US)

( * ) Notice: Subject to any disclaimer, the term of this patent is extended or adjusted under 35 U.S.C. 154(b) by 0 days.

(21) Appl. No.: 14/614,194

(22) Filed: Feb. 4, 2015

(65) Prior Publication Data

US 2015/0219905 A1    Aug. 6, 2015

Related U.S. Application Data

(60) Provisional application No. 61/935,962, filed on Feb. 5, 2014.

(51) Int. Cl.
*G02B 27/09* (2006.01)
*G02B 5/18* (2006.01)
(Continued)

(52) U.S. Cl.
CPC ....... *G02B 27/0905* (2013.01); *G02B 5/1861* (2013.01); *G02B 6/262* (2013.01);
(Continued)

(58) Field of Classification Search
CPC .............. G02B 27/0905; G02B 27/283; G02B 27/0944; G02B 27/0994; G02B 27/0927;
(Continued)

(56) References Cited

U.S. PATENT DOCUMENTS 3,748,015 A    7/1973   Offner
3,773,404 A    11/1973  Moore
(Continued)

FOREIGN PATENT DOCUMENTS

JP      05-277776      10/1993
JP      2000-343257    12/2000
(Continued)

OTHER PUBLICATIONS

Erdmann, et al., "Coherence management for microlens laser beam homogenizers," Proceedings of SPIE, Vo. 4775, pp. 145-154 (2002).
(Continued)

*Primary Examiner* — Bumsuk Won
*Assistant Examiner* — Wen Huang
(74) *Attorney, Agent, or Firm* — Klarquist Sparkman, LLP (57) ABSTRACT

A line beam system includes a single-emitter light engine including a plurality of separately spaced single-emitter diode lasers, each emitter configured to emit a diode laser beam. Beam spacing optics are optically coupled to the single-emitter light engine and situated to provide propagation axes of the diode laser beams in a close-packed parallel configuration. A light pipe having a longitudinal axis is situated to provide an output beam with a homogenized intensity profile across one or more axes by receiving a close-packed, combined beam and reflecting the beam within the light pipe. Coherence reduction is produced by diffraction of a close-packed combined beam or by propagation in the light pipe.

20 Claims, 7 Drawing Sheets

(51) Int. Cl.
*G02B 6/26* (2006.01)
*G02B 6/42* (2006.01)
*G02B 27/10* (2006.01)
*G02B 27/48* (2006.01)
*G02B 5/04* (2006.01)
*G02B 27/28* (2006.01)

(52) U.S. Cl.
CPC ....... *G02B 6/4296* (2013.01); *G02B 27/0927* (2013.01); *G02B 27/0944* (2013.01); *G02B 27/0994* (2013.01); *G02B 27/108* (2013.01); *G02B 27/48* (2013.01); *G02B 5/04* (2013.01); *G02B 27/283* (2013.01)

(58) Field of Classification Search
CPC .... G02B 6/262; G02B 5/1861; G02B 6/4296; G02B 27/108; G02B 27/48; G02B 5/04
USPC .............................................. 359/485.07, 572
See application file for complete search history.

(56) References Cited

U.S. PATENT DOCUMENTS

| | | | |
|---|---|---|---|
| 4,293,186 A | 10/1981 | Offner | |
| 4,377,339 A | 3/1983 | Coppock | |
| 4,492,427 A | 1/1985 | Lewis et al. | |
| 4,688,904 A | 8/1987 | Hirose et al. | |
| 4,711,535 A | 12/1987 | Shafer | |
| 4,932,747 A | 6/1990 | Russell et al. | |
| 5,153,773 A | 10/1992 | Muraki et al. | |
| 5,224,200 A | 6/1993 | Rasmussen et al. | |
| 5,517,359 A | 5/1996 | Gelbart | |
| 5,586,132 A | 12/1996 | Levy | |
| 5,619,245 A | 4/1997 | Kessler et al. | |
| 5,638,220 A | 6/1997 | Ohtomo et al. | |
| 5,673,135 A | 9/1997 | Yoshino | |
| 5,719,704 A | 2/1998 | Shiraishi et al. | |
| 5,936,761 A | 8/1999 | Kubota et al. | |
| 6,040,553 A | 3/2000 | Ross | |
| 6,114,088 A | 9/2000 | Wolk et al. | |
| 6,169,565 B1 | 1/2001 | Ramanujan et al. | |
| 6,498,680 B1* | 12/2002 | Zhou | G02B 6/2713 359/484.07 |
| 6,509,547 B1 | 1/2003 | Bernstein et al. | |
| 6,529,542 B1* | 3/2003 | Karlsen | H01S 5/141 372/101 |
| 6,531,681 B1 | 3/2003 | Markle et al. | |
| 6,560,039 B1 | 5/2003 | Webb et al. | |
| 6,618,174 B2 | 9/2003 | Parker et al. | |
| 6,678,308 B1 | 1/2004 | Matthews | |
| 6,707,532 B2 | 3/2004 | Suzuki | |
| 6,873,398 B2 | 3/2005 | Sievers | |
| 6,980,295 B2 | 12/2005 | Lerner | |
| 6,985,226 B2 | 1/2006 | Lerner | |
| 7,006,217 B2 | 2/2006 | Lerner | |
| 7,158,215 B2 | 1/2007 | Harned | |
| 7,167,630 B2 | 1/2007 | Eyal et al. | |
| 7,253,376 B2 | 8/2007 | Zhang et al. | |
| RE39,846 E | 9/2007 | Tanitsu et al. | |
| 7,277,229 B2 | 10/2007 | Kato | |
| 7,293,882 B2 | 11/2007 | Lerner | |
| 7,317,469 B2 | 1/2008 | Kim et al. | |
| 7,355,800 B2 | 4/2008 | Anikitchev | |
| 7,418,172 B2 | 8/2008 | Tanaka et al. | |
| 7,502,537 B2 | 3/2009 | Kurahashi | |
| 7,519,493 B2 | 4/2009 | Atwell et al. | |
| 7,545,403 B2 | 6/2009 | Kang et al. | |
| 7,545,446 B2 | 6/2009 | Lerner et al. | |
| 7,704,666 B2 | 4/2010 | Noh et al. | |
| 7,745,991 B2 | 6/2010 | Yamazaki et al. | |
| 7,776,493 B2 | 8/2010 | Kang et al. | |
| 7,792,249 B2 | 9/2010 | Gertner et al. | |
| 7,821,718 B1 | 10/2010 | Govyadinov et al. | |
| 7,847,940 B2 | 12/2010 | Karasyuk et al. | |
| 7,851,725 B2 | 12/2010 | Dane et al. | |
| 7,885,012 B2 | 2/2011 | Reynolds | |
| 7,892,382 B2 | 2/2011 | Bellmann et al. | |
| 7,995,298 B2 | 8/2011 | Chen | |
| 8,062,986 B2 | 11/2011 | Khrapko et al. | |
| 8,483,533 B1* | 7/2013 | Mehl | G02B 6/0281 385/124 |
| 8,821,963 B2 | 9/2014 | Tanaka et al. | |
| 2004/0090609 A1 | 5/2004 | Komatsuda | |
| 2005/0045604 A1 | 3/2005 | Talwar et al. | |
| 2005/0098260 A1 | 5/2005 | Chen | |
| 2006/0012842 A1* | 1/2006 | Abu-Ageel | G02B 6/0001 385/146 |
| 2006/0102605 A1 | 5/2006 | Adams et al. | |
| 2006/0176912 A1 | 8/2006 | Anikitchev | |
| 2006/0246693 A1 | 11/2006 | Tanaka et al. | |
| 2007/0063226 A1 | 3/2007 | Tanaka et al. | |
| 2007/0147065 A1 | 6/2007 | Nagata | |
| 2007/0153847 A1 | 7/2007 | Faircloth et al. | |
| 2008/0025732 A1 | 1/2008 | Hattori | |
| 2008/0210671 A1 | 9/2008 | Jennings et al. | |
| 2008/0268201 A1 | 10/2008 | Fiacco et al. | |
| 2008/0308534 A1 | 12/2008 | Li et al. | |
| 2009/0046923 A1 | 2/2009 | Chang et al. | |
| 2009/0127477 A1 | 5/2009 | Tanaka | |
| 2009/0219491 A1 | 9/2009 | Williams et al. | |
| 2009/0236495 A1 | 9/2009 | Jennings et al. | |
| 2009/0296751 A1 | 12/2009 | Kewitsch et al. | |
| 2010/0048036 A1 | 2/2010 | Tanaka et al. | |
| 2010/0097680 A1 | 4/2010 | Naftali et al. | |
| 2010/0140478 A1 | 6/2010 | Wilson et al. | |
| 2010/0171931 A1 | 7/2010 | Kessler | |
| 2010/0254717 A1 | 10/2010 | Miller | |
| 2011/0043900 A1 | 2/2011 | Bayramian | |
| 2012/0045169 A1 | 2/2012 | Hu | |
| 2012/0057345 A1 | 3/2012 | Kuchibhotla | |
| 2012/0069861 A1 | 3/2012 | Neuberger | |
| 2012/0248078 A1 | 10/2012 | Zediker et al. | |
| 2012/0268836 A1 | 10/2012 | Mercado | |
| 2012/0273269 A1 | 11/2012 | Rinzler et al. | |
| 2013/0058092 A1 | 3/2013 | Anisimov | |
| 2013/0107360 A1 | 5/2013 | Kurtz et al. | |

FOREIGN PATENT DOCUMENTS

| | | |
|---|---|---|
| JP | 2006-278491 | 10/2006 |
| WO | WO 2011/142849 | 11/2011 |

OTHER PUBLICATIONS

International Search Report and Written Opinion for International Application No. PCT/US2013/033424, 9 pages, mailed Jul. 18, 2013.

Positive Light, Inc. "Relay Imaging in Rod Amplifier Systems," Technical Bulletin, 2 pages, (May 2002).

Schmitt et al., "Illumination uniformity of laserfusion pellets using induced spatial incoherence," Journal of Applied Physics, vol. 60(1), pp. 6-13 (Jul. 1, 1986).

French et al., "Absorption Edge and Band Gap of SiO2 Fused Silica Glass," Ceramic Transactions, 28:63-80. (1992).

Summary of First Office Action from the State Intellectual Property Office of the People's Republic of China for Chinese App. No. 201380012279.9, mailed Oct. 26, 2015, 4 pages.

* cited by examiner

SINGLE-EMITTER LINE BEAM SYSTEM

CROSS REFERENCE TO RELATED APPLICATION

This application claims the benefit of U.S. Provisional Application No. 61/935,962, filed Feb. 5, 2014, which is incorporated herein by reference in its entirety.

FIELD

The disclosure pertains to high power laser line beam systems.

BACKGROUND

Figure 1:
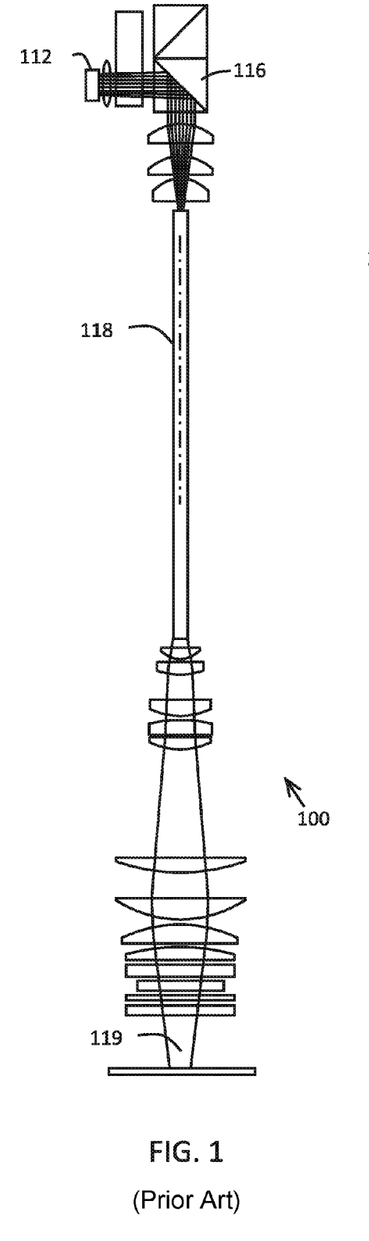
FIG. 1 shows a side-view of a conventional, laser bar-based diode laser line generator.

Conventional line beam generators are typically based on stacks of microchannel cooled laser diode bars and have numerous reliability problems. Some problems include erosion and leaking of the microchannel coolers, leakage around 0-rings or other seals, and movement or misalignment over time of fast-axis collimation (FAC) optics. FIG. 1 shows a conventional bar-based line generator 100 that includes fourteen diode laser bars 112, each having sixty-three emitters, and that emits a total of eight hundred eighty-two diode laser beams. Additionally, fast-axis collimation lenses, an interleaver, a polarizer and mirror monolithic assembly 116, and other line beam optics, including a homogenizing light pipe 118 which receives incident beams directly aligned with a longitudinal axis thereof, are required to form a laser line output beam 119. While high reliability single emitter laser sources, which are cooled with standard cold plates, can be used in high power line beam systems instead of microchannel cooled bars, the possibility of such use is typically dismissed as an alternative since the reduction in the total number of laser sources increases the probability of non-uniformity in the line beam due to self-interference (or coherence) effects between sources. Accordingly, a need remains for innovation directed to solving the latent reliability problems as well as other problems in the high power line beam systems.

SUMMARY

In some examples, line beam systems comprise a plurality of spaced-apart single-emitter diode lasers, each configured to emit a corresponding laser beam along a respective emitted beam axis. A coherence-reducing optical system is situated to receive the laser beams and establish an optical path length difference among the optical beams so as to produce a reduced coherence beam. A line beam optical system receives the reduced coherence beam and directs a line beam towards a target. According to some examples, the coherence-reducing optical system includes a light guide having a longitudinal axis, the light guide producing the coherence-reduced output beam based on path length differences in the light guide, wherein the light guide is situated with respect to the light guide so as to asymmetrically receive the emitted beams. In some examples, the light guide is situated so that an angular beam diameter of the received emitted beams is about ½ an angle of incidence to the light guide. According to other embodiments, the coherence-reducing optical system includes a diffraction grating situated to receive the emitted beams and produce the reduced coherence beam as a diffracted beam have a beam path difference associated with diffraction angle. In some other embodiments, a beam spacing optical system receives the emitted beams and directs the emitted beams along close-packed axes that are more closely spaced that the emitted beam axes as a close-packed, combined beam, wherein the diffraction grating receives the close-packed combined beam and produces the reduced coherence beam based on the close-packed, combined beam. According to additional examples, the beam spacing optical system includes at least one rhomboidal prism that directs at least one emitted beam along a close-packed axis. In typical examples, the beam spacing optical system includes as least one beam splitter situated to produce at least two beams from at least one emitted beam, and direct the two beams along respective close-packed axes. In some embodiments, the at least one beam splitter is a polarizing beam splitter that produces the at least two beams in orthogonal states of polarization. According to other examples, a cylindrical mirror is situated to receive the diffracted beam and direct the diffracted beam into the light guide.

Methods comprise collimating a plurality of single-emitter diode laser beams and directing the collimated single-emitter diode laser beams to produce a close-packed, combined beam. The close-packed, combined beam is directed into a light pipe so as to reduce beam spatial coherence and produce a coherence-reduced output beam. The intensity of the coherence-reduced output beam is homogenized across at least one axis that is orthogonal to a direction of propagation of the coherence-reduced output beam and a line beam is formed based on the coherence-reduced output beam. Typically, the close-packed, combined beam is directed asymmetrically into the light pipe. In other examples, the close-packed, combined beam is diffracted so as to form a diffracted beam so as to reduce beam coherence and the diffracted beam is directed into the light pipe. In still further examples, emitted beams with a longest path length delay associated with the diffraction grating are directed into the light pipe at a largest angle with respect to a longitudinal axis of the light pipe.

Line beam systems comprise at least two single emitter diode laser modules that include respective pluralities of diode lasers situated along a first axis so that the diode lasers emit beams parallel to a second axis, wherein the at least two single emitter laser diode modules are displaced with respect to each other along a third axis, wherein the first, second, and the third axes are substantially mutually orthogonal. A beam-spacing optical system receives the emitted beams and forms a close-packed combined beam, the beam-spacing optical system including at least one rhomboid prism that establishes a close-packed beam propagation axis and a beam splitter that receives at least one of the emitted beams and produces at least two associated close-packed beams. A diffraction grating and a light pipe are situated to receive the close-packed, combined beam and produce a coherence-reduced beam. A beam steering optical includes a first cylindrical lens situated to receive and converge the coherence-reduced beam. A fold mirror is situated to receive the converged, coherence-reduced diode beam and a second cylindrical lens is situated to receive the converged, coherence-reduced diode beam from the fold mirror. A polarizing mirror receives the coherence-reduced, combined beam and reflects the coherence-reduced, combined beam in first state of polarization. A focus optical system is situated to receive the reflected, coherence-reduced, combined beam in the first state of polarization line and direct a line beam toward a target. In some examples, the polarizing mirror is situated to transmit portions of the line beam from the target to a beam dump. According to other embodiments, the beam splitter of the beam-spacing optical system is a polarizing beam splitter that produces output beams in orthogonal states of polarization.

The foregoing and other objects, features, and advantages of the disclosed technology will become more apparent from the following detailed description, which proceeds with reference to the accompanying figures.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

As used herein, optical radiation refers to electromagnetic radiation at wavelengths of between about 100 nm and 10 μm, and typically between about 500 nm and 2 μm. Examples based on available laser diode sources generally are associated with wavelengths of between about 800 nm and 1700 nm. In some examples, propagating optical radiation is referred to as one or more beams having diameters, beam cross-sectional areas, and beam divergences that can depend on beam wavelength and the optical systems used for beam shaping. For convenience, optical radiation is referred to as light in some examples, and need not be at visible wavelengths.

Optical beams and optical elements are described in some examples with respect to one or more axes. Typically, an axis includes one or more straight line segments along which an optical beam propagates or along which one or more optical elements are situated. Such axes can be bent or folded with reflective surfaces, so that axes need not be single straight line segments. In some examples, reflective surfaces defined by internal reflection in one or more prisms are used, but such reflective surfaces can be provided as reflective surfaces such as dielectric or metallic coatings. In addition, rhomboidal prisms are used in the examples for convenient illustration. As used herein, a rhomboidal prism is a solid having two sets of parallel optical surfaces, with the optical surfaces of each set at an angle of 45 degrees with respect to the surfaces of the other set. In some cases, polarization dependent coatings are used to separate s- and p-polarization components of optical beams, typically as part of a polarizing beam splitter. Light guides are used to reduce beam coherence. As used herein, light guides include light pipes of circular, rectangular or other cross-section. Light guides can be light pipes having a cavity in which beams propagate, but other types of light guides such as rod integrators or other beam homogenizers can be used. To from line beams, laser beams in a common plane or forming a narrow sheet are directed into a rectangular or square light pipe so as to be reflected by the light pipe while remaining substantially in the common plane or within the narrow sheet.

In some examples, a plurality of laser beams propagating along a respective beam axes are directed to a beam-spacing optical system that redirects the beams along more closely spaced axes. Such beams are referred to as close-packed, and the combined beams are referred to as a close-packed, combined beam. In some examples such beam spacing optical systems also include beam splitters so as to increase beam number.

In one embodiment, a line generator includes a plurality of single emitter diode lasers that are free-space coupled to line generator optics. The free-space coupling can have the added benefit of maintained beam quality. Moreover, the interleaver required by conventional systems can be eliminated. In some disclosed examples, a single light engine module housing a plurality of single emitters is used. The plurality of diode emitters can generate 200 W to 1,000 W of continuous wave output power. In one such example, seventy-two single-emitters are separately arranged to generate 500 W of continuous wave power. To mitigate spatial and temporal coherence problems associated with single-emitter outputs, phase delays of many temporal coherence lengths across the width of each beam are introduced. The phase delays and associated coherence reduction are created by one or more of a diffraction grating, a light pipe used for homogenization of single emitter diode laser beams, and a selection of launch angle between the laser beams and the light pipe.

Figure 2:
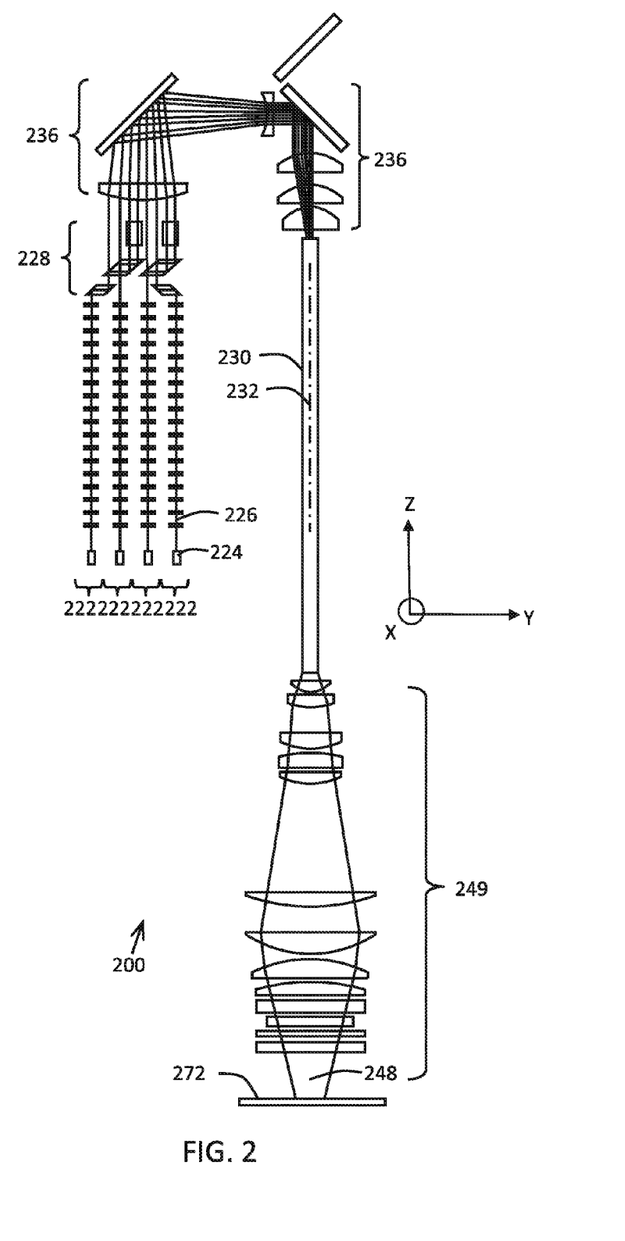
FIG. 2 shows a side-view of a representative laser line generator based on a plurality of single-laser diode emitters.

FIG. 2 depicts a line beam system 220 that includes four rows 222 of eighteen single-emitter diode lasers 224 that produce corresponding beams 226 in two parallel plane groupings with one plane grouping being shown and the other plane grouping being situated below the first. The diode lasers 224 of reach of the rows 222 are arranged so as to stack in a direction perpendicular to the plane of FIG. 2, i.e., in an X-direction with respect to a coordinate system 10. The diode lasers in a selected row or all rows can also be offset along a Z-axis. The beams 226 are directed to beam spacing control optics 228, such as one or more prisms which translate the beams 226 so as to propagate more closely together and in the same plane grouping. In other examples, beam spacing control optics can be configured to adjust beam spacings so as to be larger or smaller, and beam spacings between the beams need not be the same. In one example, each of the single-emitter diode lasers 224 operates at approximately fourteen times higher power than each emitter in a corresponding diode bar, though it will be appreciated that a range of single-emitter diode laser output powers is possible.

Since interference effects tend to be proportional to the square root of the number of optical beams that are used to produce a combined beam, interference effects attributed to the use of fourteen times fewer single-emitter diodes increase by a factor of about 3.7. To decrease coherence in systems using reduced numbers of single emitters such as shown in FIG. 2, the beams 226 are directed with beam forming optics 236 into a light pipe 230 at an angle with respect to a longitudinal axis 232 of the light pipe 230. As shown in FIG. 2, the beam forming optics can include on or more lenses that converge the combined beams for coupling to the light pipe 230 as well as one or more reflective surfaces to direct the combined beams along a preferred direction. The light pipe 230 can be a solid or hollow light pipe as may be convenient. The beams 226 are incident to the light pipe 230 at a range of angles with respect to an axis 232 of the light pipe 230. As shown in FIG. 2, the beams 226 are incident with a single sided half angle, and typically the combined beam does not fill the full available numerical aperture of the light guide 230. An output beam from the light pipe 230 is directed by a lens system 249 as an output beam 248 to a target surface 272.

Figure 3:
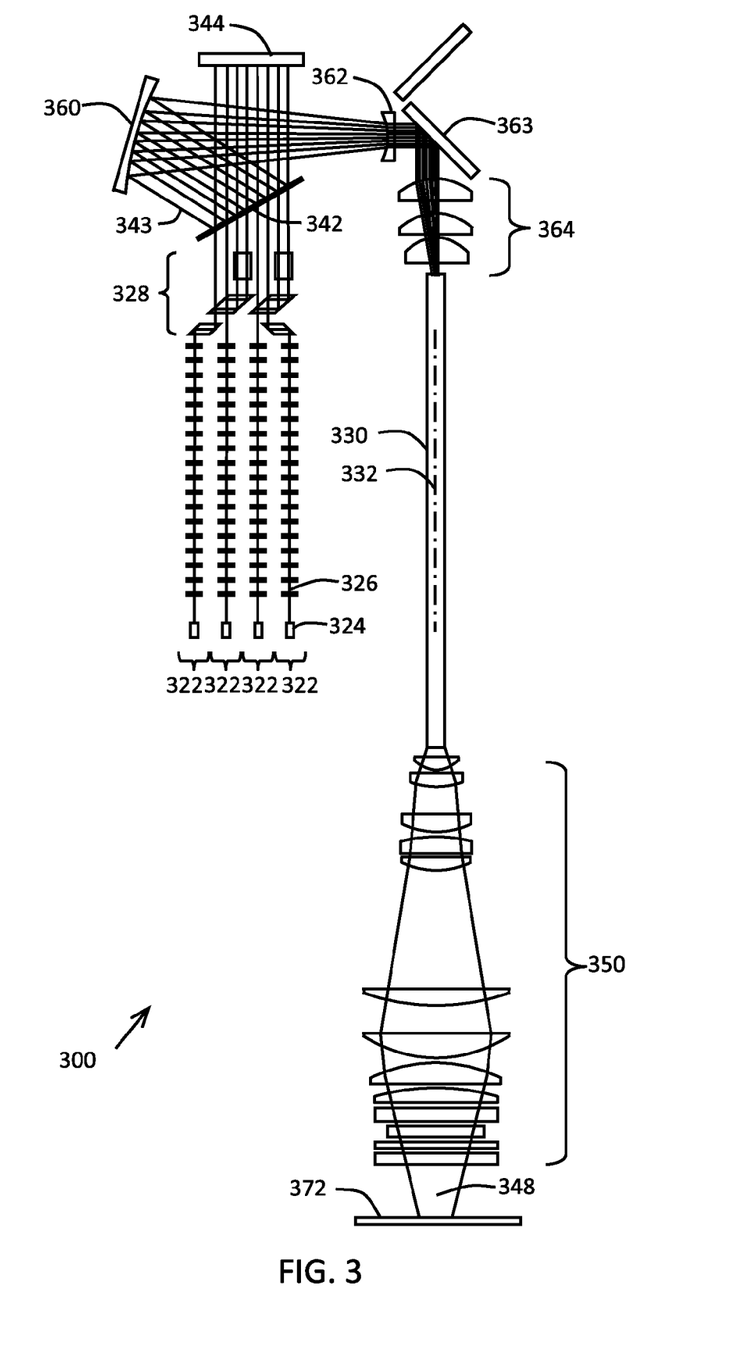
FIG. 3 shows a side-view of another representative single-emitter based laser line generator.

FIG. 3 illustrates a representative line beam system 300 that can provide additional coherence reduction. Single-emitter diode lasers 324 arranged in rows 322 produce beams 326 that propagate along parallel axes. A beam spacing prism system 328 receives the beams 326 and outputs the beams 326 along parallel, but differently spaced axes, typically more closely spaced axes, as a spacing-adjusted combined beam. A diffraction grating 342 is disposed to receive the spacing-adjusted combined beam 326 and diffract a substantial portion of the beam power (e.g., 80%, 90%, 95% or more of the beam power) at an angle as a combined redirected beam 343. An undiffracted beam portion is directed to a beam stop 344. The redirected combined beam 343 is then focused and directed into a light pipe 330 with a concave mirror 360, lenses 362, 364, and a reflector 363. The redirected combined beam is directed into the light pipe 330 at an angle with respect to a light pipe axis 332. A homogenized, coherence-reduced beam from the light pipe 300 is incident to a lens system 350 and directed to a target surface 372 as a working beam 348.

Some portions of the representative embodiments of FIGS. 2-3 such as beam spacing prism systems, the focusing systems that direct combined beams into light pipes, and light pipes or light guides can be used with one or more laser diode bars as well. In some cases, one or more such portions can be incorporated into a previously deployed line beam system so that much of the existing line beam installation, including housing portions and optics can remain intact.

Figure 4:
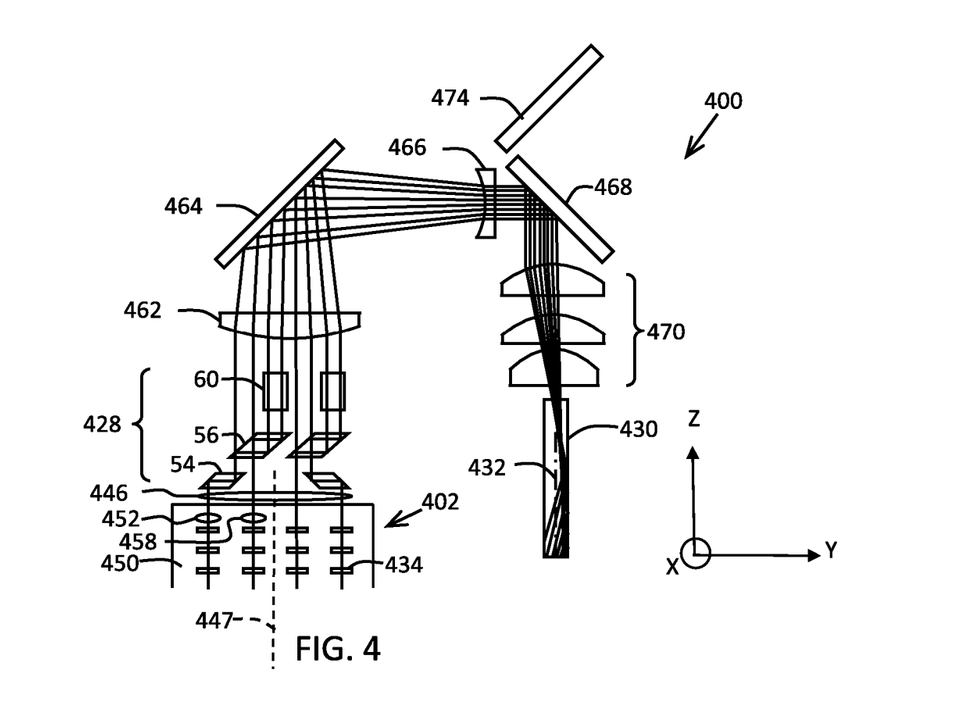
FIG. 4 shows an expanded view of a portion of the embodiment shown in FIG. 2.

FIG. 4 shows an expanded view of a portion of a representative line beam system 400. Single-emitter diode lasers (not shown) associated with a diode assembly 402 are arranged in a staircase that extends vertically with respect to the plane of FIG. 4 (i.e., in an X-direction) and emit diode laser beams which are collimated individually by fast-axis collimation optics (not shown) and slow-axis collimation optics such as representative slow axis collimation optics 434. In a specific example, the diode assembly 402 includes seventy-two single-emitter chiplet diode lasers arranged in a staircase fashion on a conductively cooled plate 450. In this example, each emitter has a 350 µm stripe width and can emit up to 15 W at a wavelength of about 808 nm. It will be appreciated that other laser diodes can be used and such laser diodes can have other features, such as different stripe widths, output powers, wavelengths, etc., and can be selected based on particular application requirements. In some cases, the diode assembly 402 includes different types of laser diodes. A staircase configuration of beams can permit close packing of optical beams with respect to beam slow axes.

The chiplet emitters are oriented such that propagation axes of respective output beams are parallel to an axis 447 of a light engine output beam 446 which is parallel to, but propagating in the opposite direction of, an output beam 148 of the line beam system 20 as shown in FIG. 2. The chiplets are typically evenly-spaced in a direction perpendicular to the axis 447 within the diode assembly 402. In some examples, the chiplets are grouped into two groups spaced apart from each other in the X direction, i.e., into or out of the plane of FIG. 4. In some examples, the diode assembly 402 is secured so as to be removable without opening any housings associated with a workpiece or downstream optics, limiting the risk of particulate contamination. In one representative line generator system, chiplets are mounted to the cooled base plate 450 that is thermally coupled to a housing surface. The cooled base plate 450 is preferably made of aluminum or copper, but other metals or suitable heat conductive materials can be used. The cooled base plate 450 can be formed as part of the diode assembly housing or can be separately formed and bolted to a housing.

In the example of FIG. 4, four columns of eighteen beams are shown in two separate groups associated with parallel planes, one plane being below the other with respect to the plane of FIG. 4. A beam spacing prism assembly 428 is coupled to the beams and translates the beams so that the beams propagate in a close-packed configuration. As shown in FIG. 4, the close-packed beams propagate parallel to the axis 447, but in other examples, the beam spacing prism assembly 428 can direct the beams so as to propagate at one or more different angles with respect to the axis 447. In one example, thirty-six collimated beams in first and second columns 452, 458 are directed to propagate adjacent each other and into the same plane grouping of the two plane groupings of beams 426. Other columns of beams are similarly combined into a close-packed relationship.

A cylinder lens 462 is situated to receive the close-packed beams and to converge the closed-packed beams. A fold mirror 464 receives the converged beams to a cylinder lens 466 and are then reflected at another fold mirror 468, which is polarizing, at another approximately ninety degree angle. An optical system 470 receives the beams reflected by a polarizer mirror 468 and directs the beams into a light pipe 430 so that the converged, combined beams are directed into the light pipe 430 at a non-zero angle with respect to an axis 432 of the light pipe 430. Portions of a beam reflected at a target surface or that is otherwise back-coupled into the light pipe 430 can propagate through the polarizer mirror 468 to a mirror 474 so as to be directed away from other elements of the line beam system 400 instead of being reflected back into the line beam system 400 so as to prevent component damage. Back-reflected beam portions reflected by the mirror 474 can be directed to a beam dump.

Figure 5:
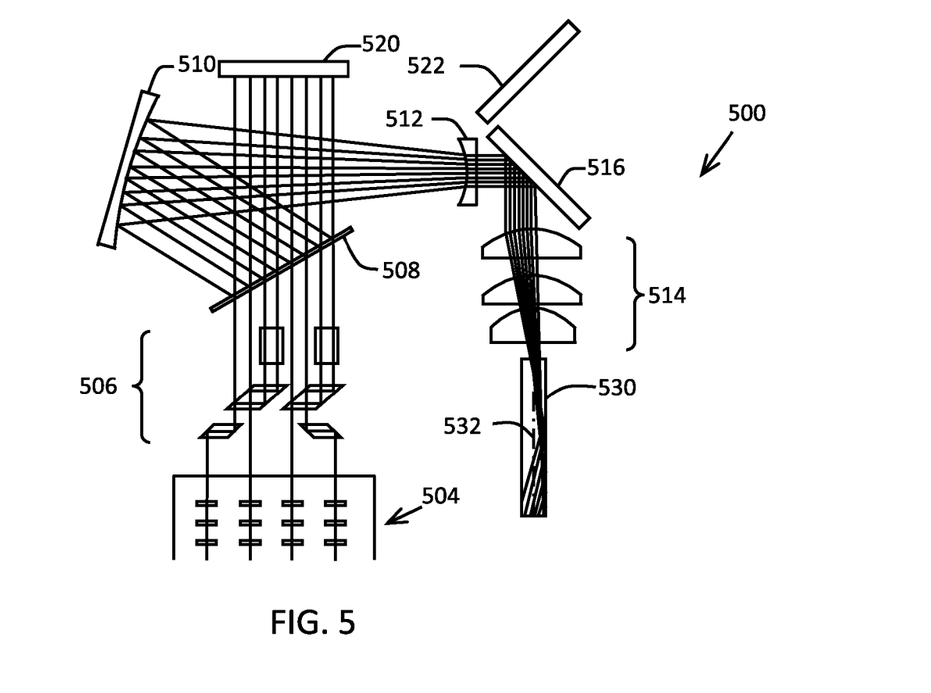
FIG. 5 shows an expanded view of a portion of the embodiment shown in FIG. 3.

FIG. 5 shows a portion of a representative line beam system 500. A plurality of single-emitter laser diodes in a common package 504 direct laser beams to beam spacing prisms 506 so that a combined, close-packed beam is delivered to a diffraction grating 508. The diffracted, combined beam is coupled into a light guide 530 with a cylindrical mirror 510, a cylindrical lens 512, a beam shaping optical system 514, and a polarizing mirror 516. The diffraction grating 508 is disposed in the path of the diode laser beams so as to receive the close-packed, combined beams from the beam spacing prisms 506. The diffraction grating 508 preferably diffracts most of the power of the close-packed, combined beams at an angle between zero and ninety degrees with respect to the propagation direction upon exiting the beam spacing prisms 506. Undiffracted beam portions and beam portions returned from a work piece surface are captured by beam dumps 520, 522, respectively.

In order to reduce coherence in continuous wave laser beams, a variable path length delay can be introduced such that a path length is different for different locations across a beam width. In some disclosed examples, a light pipe or light guide that receives an off-axis combined beam provides suitable path length variation as well as providing a more uniform beam intensity. Beam portions associated with higher incidence angles have longer path lengths than on-axis portions or portions at smaller incidence angles. If a combined beam is launched straight into a light pipe, beam portions at symmetric angles of incidence have identical path lengths. To reduce coherence and beam interference, a combined beam can be asymmetrically launched into a light guide.

Figure 6:
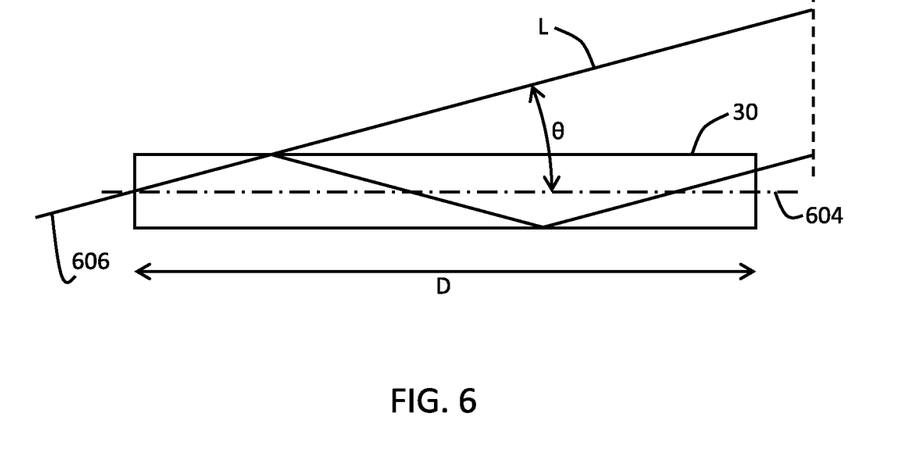
FIGS. 6-8 show diagrams depicting path-length variations.

Referring now to FIG. 6, a hollow light pipe 602 having a central axis 604 is situated to receive an optical beam along an axis 606 that is at an angle $\theta$ with respect to the central axis 604. An optical path length L for such a beam is given by $D/\cos\theta$, wherein D is a light pipe length. An optical path length difference with respect to an optical beam propagating parallel to the axis 604 is $D/\cos\theta - D$. This path length difference may be small unless the angle $\theta$ is sufficiently large because $\cos\theta$ varies as $\theta^2$ for small angles. For a solid light guide of refractive index n, refraction of the input beam results in an angle of propagation $\theta'$ in the light guide so that the optical path difference is $n(D/\cos\theta' - D)$.

Figure 12:
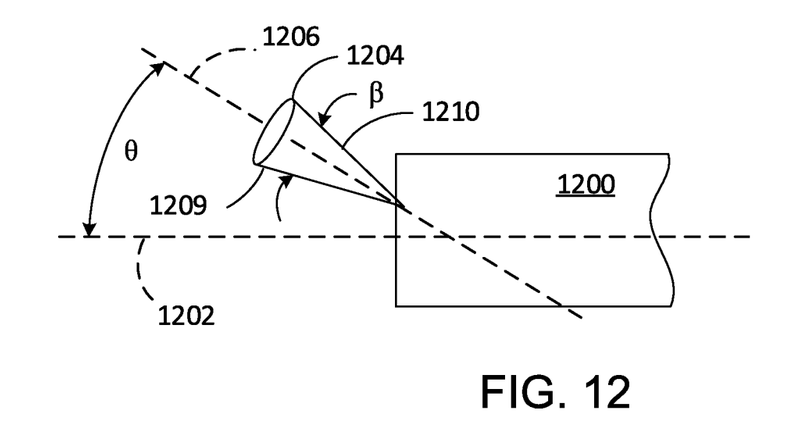
FIG. 12 illustrates asymmetric incidence of a combined laser beam containing a plurality of individual laser beams to a light pipe.

Path difference in a light pipe is further illustrated in FIG. 12. A light pipe 1200 having an axis 1202 is situated to receive a combined laser beam 1204 propagating along an axis 1206 that is at an angle of incidence $\theta$ with respect to the light pipe axis 1202. The combined beam has an angular diameter of $\beta$. Setting the angle of incidence $\theta$ to one-half the angular diameter, i.e., $\beta/2$, the maximum path difference for beam edge 1209 is $D/\cos(\beta/2) - D$ with respect to beam edge 1210 for a light pipe of length D as discussed above. Maximum path differences for other angles can be similarly determined.

Figure 7:
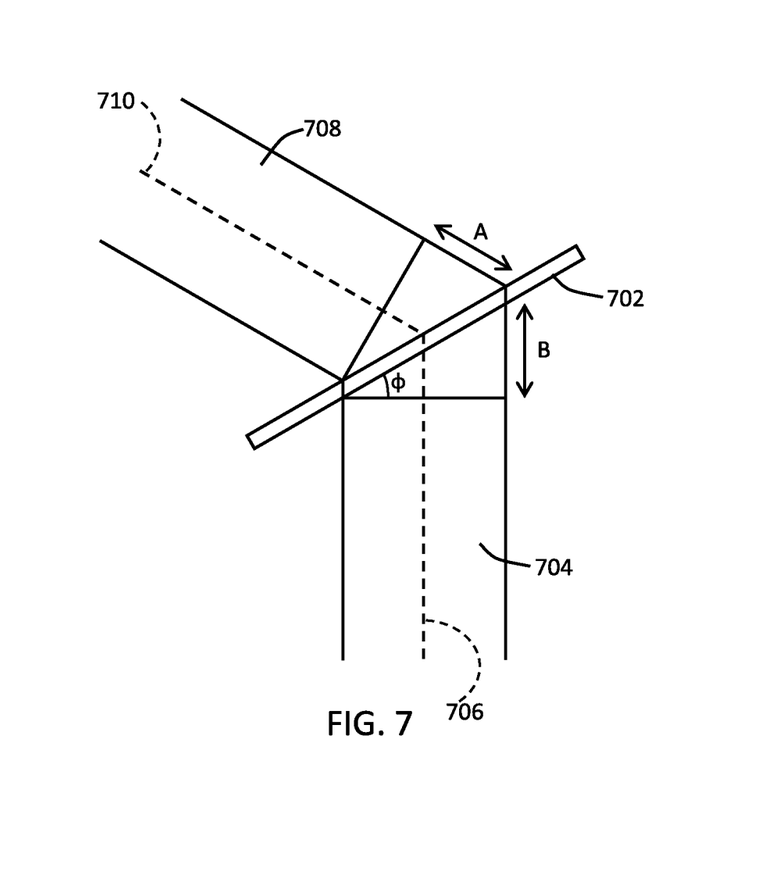

In some examples, sufficient optical path difference for coherence reduction may not be provided by asymmetric optical beam launch into a light pipe or an asymmetric launch may be impractical. Referring to FIG. 7, a transmissive diffraction grating 702 is situated to receive an optical beam 704 propagating parallel to an axis 706. The transmissive grating produces a diffracted beam 708 that propagates parallel to an axis 710 at an angle $2\phi$ with respect to the axis 706. A total path length difference introduced is a sum of path segments A and B. This path length difference varies across the width of the optical beam 704 and can provide sufficient coherence reduction. A transmissive grating is shown for convenience, but a reflective grating can be used as well.

Figure 8:
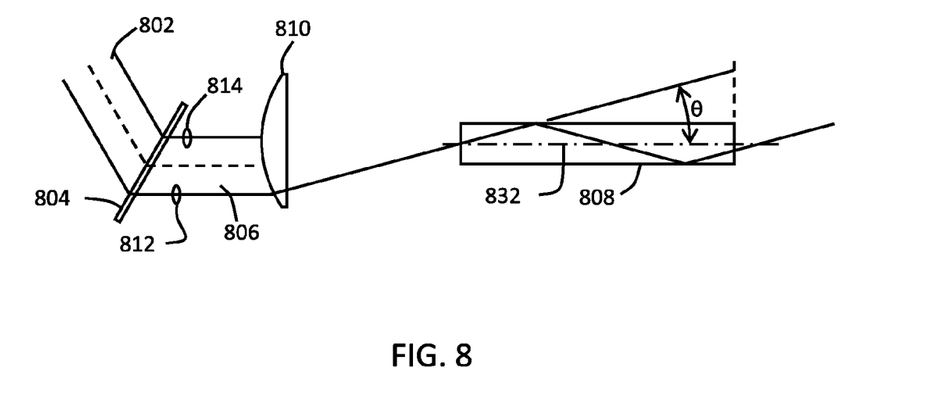

Both a transmission grating and an asymmetric launch angle in a light pipe can be used to increase path length difference and decrease coherence. In one example, depicted in FIG. 8, an input optical beam 802 is diffracted by a grating 804, and a diffracted beam 806 is focused into a light guide 808 with a lens 810. A portion 812 of the input optical beam 802 that experiences a longest path length as a result of diffraction at the grating 804 is directed at a largest angle of incidence $\theta$ into the light guide 808. This portion 812 of the diffracted beam 806 accumulates a path length that is a sum of the path lengths associated with the grating 804 and the light guide 808. This arrangement produces a largest path difference for the beam portion 812 and a beam portion 814.

Figure 9:
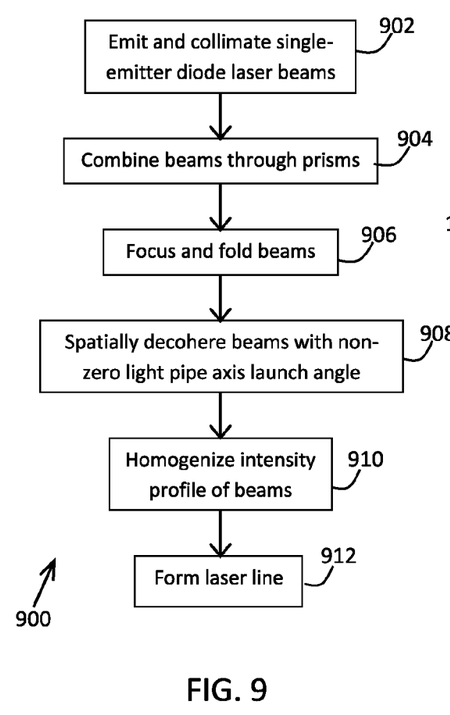
FIGS. 9 and 10 depict example coherence reduction methods.

FIG. 9 illustrates a representative method 900 of forming laser line beams using single-emitters instead of more conventional diode laser bars. At 902, a plurality of single-emitter diode lasers are situated to emit laser beams along respective axes. These beams are typically collimated to preserve beam characteristics as the beams are directed to and manipulated by subsequent optical components in the propagation paths. The beams are combined at 904 using prisms, mirrors, or other optical elements so as to adjust beam spacings, typically to produce more closely packed beams. The combined beams are focused and folded at 906 to be received by a light guide such as a light pipe. At 908, the combined beams are directed into the light pipe at a selected angle (typically asymmetrically) with respect to a longitudinal axis of the light pipe such that beam coherence is reduced, typically based on propagation and multiple reflection in the light pipe. At 910, an intensity profile of the beams is homogenized, if needed, but typically, propagation in the light pipe produces sufficient beam homogenization. At 912, a laser line beam based on an output beam from the light pipe is directed to a target. The line beam can have a uniform intensity along a line axis which is generally perpendicular to the principal direction of beam propagation. Intensity variations can be less than 5%, 2%, 1%, 0.5%, or 0.1% over at least 75%, 80%, 90%, 95%, or more of the line beam width. Optical powers of greater than 200 W and up to 1 kW or more can be produced in such line beams.

Figure 10:
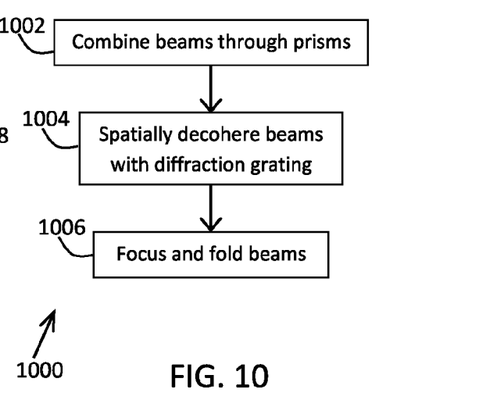

In an alternative shown in FIG. 10, a method 1000 included combining a plurality of single emitter laser beams at 1002 and reducing beam coherence at 1004 using a diffraction grating. At 1006, the combined reduced coherence beams are reflected, refracted, and/or focused as desired to form a suitable line beam for a selected application. In some examples, additional path length is difference is introduced with a light pipe.

Figure 11A:
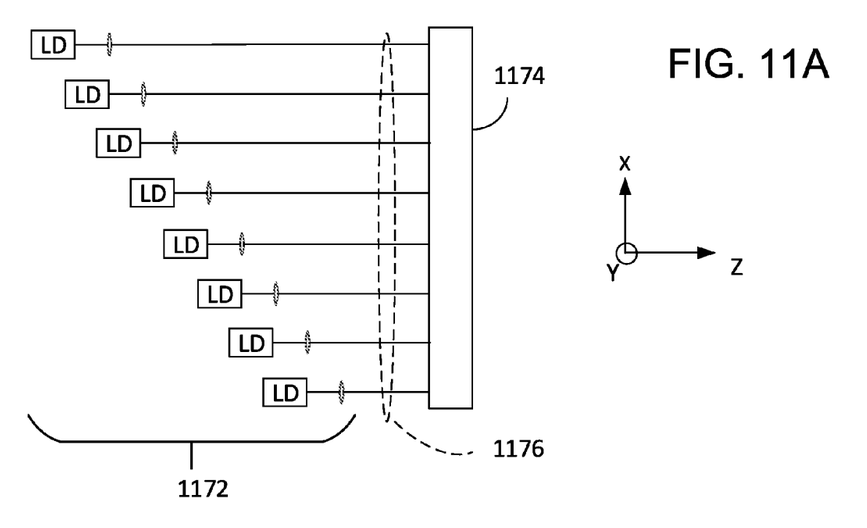
FIGS. 11A-11B illustrate prism assemblies for combining beams from individual laser diodes.
Figure 11B:
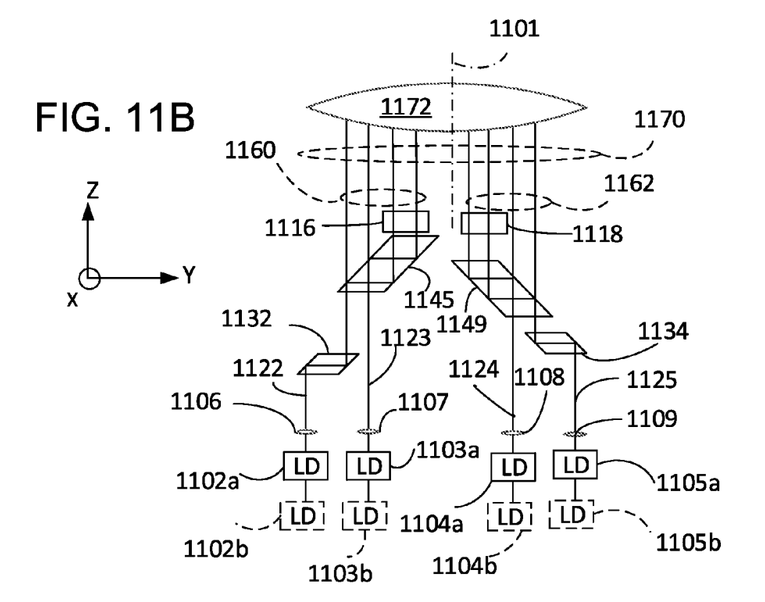

Referring to FIG. 11A, a laser diode module 1172 includes a plurality of laser diodes and associated collimation optics so as to produce a plurality of beams that are directed to a prism assembly 1174 as a combined beam 1176. As shown in FIG. 11A, the lasers are stacked along an X-direction, and have different propagation distances to the prism assembly. In some examples, the lasers are situated so as to have a common propagation distance. One or more laser diode modules such as the laser diode module 1172 can be used to produce a line beam. In an example shown in FIG. 11B, four such modules are used. The modules are situated so that the laser diodes are arranged in an X-direction (perpendicular to the plane of FIG. 11B). Representative laser diodes 1102a-1105a and associated collimation lenses 1106-1109 direct respective beams along axes 1122-1125. Laser diodes 1102b-1105b are situated below the laser diodes 1102a-1102b (i.e., along the X-axis) are have associated collimation lenses as well, and direct respective beams along the axes 1122-1125. For convenient illustration, only a single collimation lens of each of the modules is shown in FIG. 11B. Rhomboid prisms 1132, 1134 are situated to directed beams propagating along the axes 1122, 1125 so as to propagate on axes closer to a central axis 1101. Rhomboid prisms 1145, 1149 are situated to receive and beams from laser diodes 1102b, 1105b leaving beams from laser diodes 1102a, 1105a unaffected. Lower beams associated with laser diodes 1103b, 1104b are jogged by respective prisms 1145, 1149 leaving upper beams 1103a, 1104a unaffected. The lower beams 1102b, 1103b, 1104b, 1105b jogged by the rhomboid prisms 1145, 1149 are then jogged up with prisms 1116, 1118 to be closer to, or approximately in the same plane as, the upper beams associated with laser diodes 1102a-1105a. The output beams 1160, 1162 form a close-packed combined beam 1170 that is directed on a lens 1172 or other optical elements so as to be shaped and focused for delivery to a target. Particular prism configurations are shown in FIG. 11B, but other arrangements can be used, and reflective surfaces can be provided with or without solid prisms. In addition, similar prism assemblies are used with other laser diodes in the laser diode modules, or the prism assemblies shown in FIG. 11B can extend along the X-axis so as to be suitable for some or all laser diodes of a diode laser module.

In view of the many possible embodiments to which the principles of the disclosed technology may be applied, it should be recognized that the illustrated embodiments are only preferred examples and should not be taken as limiting the scope of the disclosure. We claim all that comes within the scope and spirit of the appended claims.

We claim:

1. A line beam system, comprising:
   a plurality of spaced-apart single-emitter diode lasers, each configured to emit a corresponding laser beam along a respective emitted beam axis;
   a coherence-reducing optical system situated to receive the laser beams and establish an optical path length difference among the laser beams so as to produce a reduced coherence beam; and
   a line beam optical system situated to receive the reduced coherence beam and to direct a line beam to a target;
   wherein the coherence-reducing optical system includes a light guide having a longitudinal axis that is situated at selected respective asymmetric incidence angles with respect to opposite marginal emitted beam axes at a light guide input aperture so as to asymmetrically receive the emitted beam axes, the light guide producing the coherence-reduced output beam based on path length differences in the light guide and the asymmetric incidence angles.

2. The line beam system of claim 1, wherein the light guide is situated so that an angular beam diameter of the received emitted beams is at most the larger of the asymmetric incidence angles to the light guide.

3. The line beam system of claim 1, wherein the coherence-reducing optical system includes a diffraction grating situated to receive and reduce a coherence of the emitted beams by providing a diffracted beam having a beam path difference associated with a diffraction angle.

4. The line beam system of claim 3, further comprising a beam spacing optical system that receives the emitted beams and directs the emitted beams along close-packed axes that are more closely spaced than the emitted beam axes as a close-packed, combined beam, wherein the diffraction grating receives the close-packed combined beam and reduces the coherence of the close-packed, combined beam.

5. The line beam system of claim 1, further comprising a beam spacing optical system that receives the emitted beams and directs the emitted beams along close-packed axes that are more closely spaced than the emitted beam axes as a close-packed, combined beam to the coherence-reducing optical system.

6. The line beam system of claim 5, wherein the beam spacing optical system includes at least one rhomboidal prism that directs at least one of the emitted beams along a respective one of the close-packed axes.

7. The line beam system of claim 6, wherein the beam spacing optical system is situated to direct at least one of the emitted beams along an axis that is orthogonal to the close-packed axis.

8. The line beam system of claim 4, further comprising:
   a cylindrical mirror situated to receive the diffracted beam and direct the diffracted beam into the light guide.

9. The line beam system of claim 8, wherein the light guide is a light pipe situated so that an angular beam diameter of the received diffracted beam is at most the larger of the asymmetric incidence angles to the light guide.

10. The line beam system of claim 3, wherein the diffraction grating is a reflective diffraction grating.

11. A method, comprising:
    collimating a plurality of single-emitter diode laser beams, each beam having a corresponding emitted beam axis;
    directing the collimated single-emitter diode laser beams to produce a close-packed, combined beam;
    reducing a coherence of the close-packed, combined beam based on an optical path length difference among the beams by launching the close-packed, combined beam into a light pipe so that opposite marginal emitted beam axes have asymmetrical incidence angles with respect to a longitudinal axis of the light pipe at an entrance aperture and by homogenizing the intensity of the combined beam across at least one axis that is orthogonal with respect to the longitudinal axis; and
    forming a line beam at a target based on the homogenized coherence-reduced output beam.

12. The method of claim 11, further comprising:
    diffracting the close-packed, combined beam with a diffraction grating so as to form a diffracted beam and reduce beam coherence.

13. The method of claim 12, wherein emitted beam axes with a longest path length delay associated with the diffraction grating are directed into the light pipe at a largest incidence angle with respect to the longitudinal axis of the light pipe.

14. The line beam system of claim 3, further comprising:
   at least two single emitter diode laser modules situated to include respective pluralities of the plurality of spaced-apart single-emitter diode lasers, each respective plurality situated spaced apart with respect to a first axis so that the diode lasers of the respective plurality emit beams parallel to a second axis, wherein the at least two single emitter laser diode modules are displaced with respect to each other along a third axis, wherein the first, second, and the third axes are substantially mutually orthogonal;
   a beam-spacing optical system that receives the emitted beams and forms a close-packed combined beam, the beam-spacing optical system includes at least one rhomboid prism that establishes a close-packed beam propagation axis;
   a beam directing optical system that includes:
      a cylindrical mirror situated to receive the coherence-reduced beam from the diffraction grating and converge the coherence-reduced beam;
      a fold mirror situated to receive the coherence-reduced beam from the cylindrical mirror;
      a cylindrical lens situated to receive the coherence-reduced beam from the fold mirror;
   a polarizing mirror situated to receive the coherence-reduced beam and reflect the coherence-reduced beam in a first state of polarization; and
   a beam shaping optical system situated to receive the coherence-reduced beam in the first state of polarization
   wherein the light guide is situated to receive the coherence-reduced beam from the beam shaping optical system so as to produce the coherence-reduced output beam.

15. The line beam system of claim 14, further comprising a beam dump, wherein the polarizing mirror is situated to transmit portions of the line beam to the beam dump that are received from the target.

16. The line beam system of claim 3, wherein the emitted beam axes are parallel to each other at the input and output of the diffraction grating.

17. The line beam system of claim 1, wherein an entrance aperture of the light guide is rectangular shaped.

18. The method of claim 11, wherein the entrance aperture of the light pipe is rectangular shaped.

19. The method of claim 12, wherein the emitted beam axes are parallel to each other at the input and output of the diffraction grating.

20. A line beam system, comprising:
   a plurality of spaced-apart single-emitter diode lasers, each configured to emit a corresponding laser beam along a respective emitted beam axis;
   a coherence-reducing optical system including a light guide situated to receive the laser beams and to establish an optical path length difference among the laser beams so as to produce a reduced coherence beam, the light guide having a rectangular shaped input aperture and a longitudinal axis perpendicular to the input aperture and situated with respect to the emitted beam axes so that opposite marginal beam axes have asymmetric incidence angles at the input aperture, the light guide producing the coherence-reduced output beam based on path length differences in the light guide and the asymmetric incidence angles; and
   a line beam optical system situated to receive the reduced coherence beam and to direct a line beam to a target.

* * * * *